United States Patent Office.

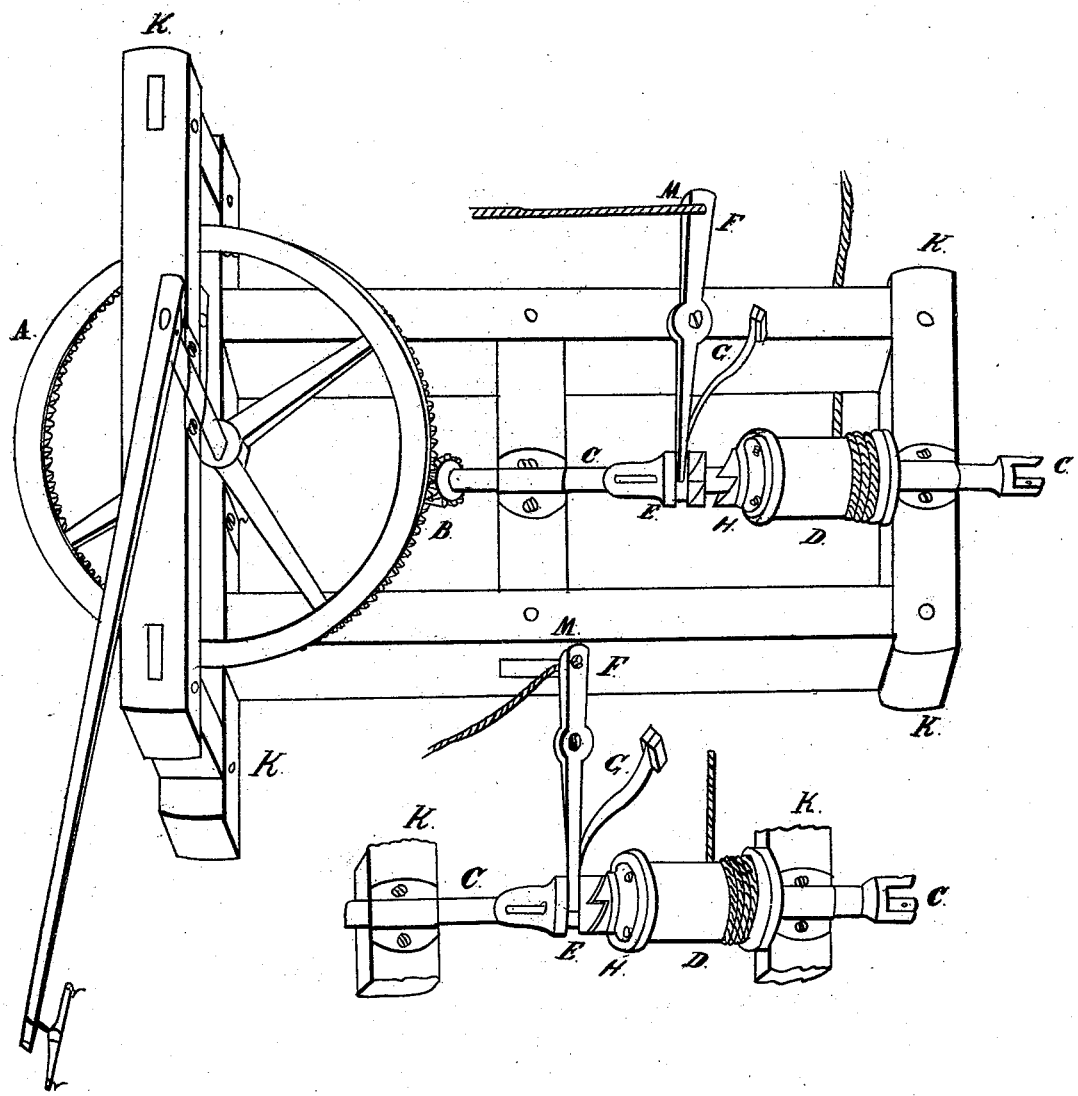

WILLIAM DERR, OF TIFFIN, OHIO.

Letters Patent No. 93,423, dated August 10, 1869.

IMPROVEMENT IN HAY-ELEVATORS.

The Schedule referred to in these Letters Patent and making part of the same.

*To all whom it may concern:*

Be it known that I, WILLIAM DERR, of Tiffin, in the county of Seneca, and State of Ohio, have invented a new and useful machine, called "Derr's Capstan for Elevating the Hay-Fork," for elevating hay and other materials; and I do hereby declare that the following is a full and exact description thereof, reference being had to the accompanying drawings, and to the letters of reference marked thereon, making a part of this specification.

The nature of my invention consists of a spool or capstan, working free on the tumbling-shaft of an ordinary horse-power, which is thrown in and out of "gear" by the person operating the fork on the load of hay. A rope is fixed to the hay-fork, and brought over pulleys in the ordinary way, and made fast to the spool or capstan.

The horse is hitched to the machine the same as to the ordinary horse-power, and walks constantly when operating the machine.

When the hay is thrown off the fork, the capstan is thrown out of gear, and the weight of fork reverses the motion of the capstan, and the fork drops at once to the load again.

By the use of this invention, no time is lost in recovering the rope, and returning the fork to its place on the load.

To enable others skilled in the art to make and use my invention, I will proceed to describe its construction and operation.

I construct a frame-work, similar to the frame-work of the ordinary horse-power, used with the threshing-machine, in which the whole machinery is placed.

I fix the master-wheel A, in the accompanying drawings, so as to work in the pinion B, and turn the shaft C.

On the shaft C, I place a spool, D, so as to work free on the shaft, and that it may be turned in either direction, without moving the shaft.

On the end of the spool is fixed a ratchet-wheel, H.

I fix a similar ratchet-wheel, E, so as to work laterally on the shaft, and fit in the ratchet-wheel H.

I fix the ratchet-lever F to the ratchet-wheel E, to move it to and from the spool, and to throw it in and out of "gear."

I place a spring, G, against the ratchet-lever, to keep the ratchet out of gear, when there is no pressure on the lever to keep it in gear.

I tie a rope to any horse hay-fork, and pass it over pulleys in the ordinary way, and fasten the other end to the spool D, passing it under the frame-work of the machine at K.

I attach a small rope to the end of the ratchet-lever at M, and pass it to the person operating the fork on the load of hay.

The horse is hitched to the lever of the master-wheel, the same as to any ordinary horse-power. The horse walks constantly, when taking off a load of hay.

I insert the fork in the hay, and throw the spool in gear by drawing on the rope attached to the ratchet-lever. The rope is drawn around the spool, and elevates the fork. When it has reached the proper height, I drop the hay by tripping the fork, then I loose my hold on the rope attached to the ratchet-lever, and the spring G throws the spool at once out of gear. The fork drops at once to the load, reversing the motion of the spool, when I insert it again, and repeat the operation.

What I claim as my invention, and desire to secure by Letters Patent, is—

The master-wheel A, working in pinion B, turning shaft C, in combination with loose spool D and ratchet-wheels E H, lever F, spring G, and rope M, arranged and operated substantially as described.

WILLIAM DERR.

Witnesses:
   U. F. CRAMER,
   G. W. BACHMAN.